United States Patent
Cross

(10) Patent No.: US 7,422,668 B2
(45) Date of Patent: Sep. 9, 2008

(54) ELECTROCHEMICAL CELLS

(75) Inventor: David Edward Cross, West Sussex (GB)

(73) Assignee: PuriCore International Limited, Stafford (GB)

( * ) Notice: Subject to any disclaimer, the term of this patent is extended or adjusted under 35 U.S.C. 154(b) by 250 days.

(21) Appl. No.: 10/521,951

(22) PCT Filed: Jul. 21, 2003

(86) PCT No.: PCT/GB03/03540

§ 371 (c)(1),
(2), (4) Date: Oct. 24, 2005

(87) PCT Pub. No.: WO2004/009498

PCT Pub. Date: Jan. 29, 2004

(65) Prior Publication Data

US 2006/0124453 A1    Jun. 15, 2006

(30) Foreign Application Priority Data

Jul. 23, 2002    (GB) .................................. 0217268.2

(51) Int. Cl.
*C25B 9/08*    (2006.01)
(52) U.S. Cl. .................... 204/263; 204/257; 204/260
(58) Field of Classification Search ............... 204/257, 204/260, 263
See application file for complete search history.

(56) References Cited

U.S. PATENT DOCUMENTS

| 673,452 | A |   | 5/1901 | Roberts |
| 4,810,344 | A | * | 3/1989 | Okazaki ............... 204/230.5 |
| 4,867,856 | A | * | 9/1989 | Okazaki ............... 204/230.5 |
| 5,427,667 | A | * | 6/1995 | Bakhir et al. .......... 204/260 |
| 5,985,110 | A | * | 11/1999 | Bakhir et al. .......... 204/257 |
| 6,033,539 | A | * | 3/2000 | Gablenko ............... 204/260 |

FOREIGN PATENT DOCUMENTS

| GB | WO9858880 | * 12/1998 |
| WO | WO 98/58880 |   12/1998 |

OTHER PUBLICATIONS

International Search Report for PCT/GB2003/03540.

* cited by examiner

*Primary Examiner*—Bruce F Bell
(74) *Attorney, Agent, or Firm*—Stradley Ronon Stevens & Young, LLP

(57) ABSTRACT

An electrochemical cell having an inner electrode mounted coaxially within an outer, electrode, with a tube mounted coaxially between them to define annular passageways for liquid flow in separate streams of the cell between respective pairs of inlet/outlet ports. A cup-shaped fitting having a stepped-down internal diameter is fastened to the inner electrode at the end of the cell with the outer electrode at the mouth of the fitting.

14 Claims, 1 Drawing Sheet

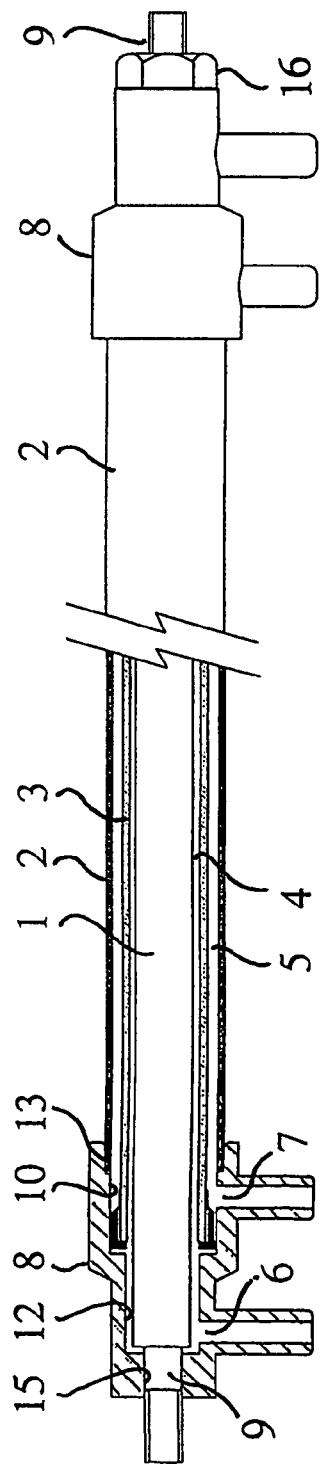
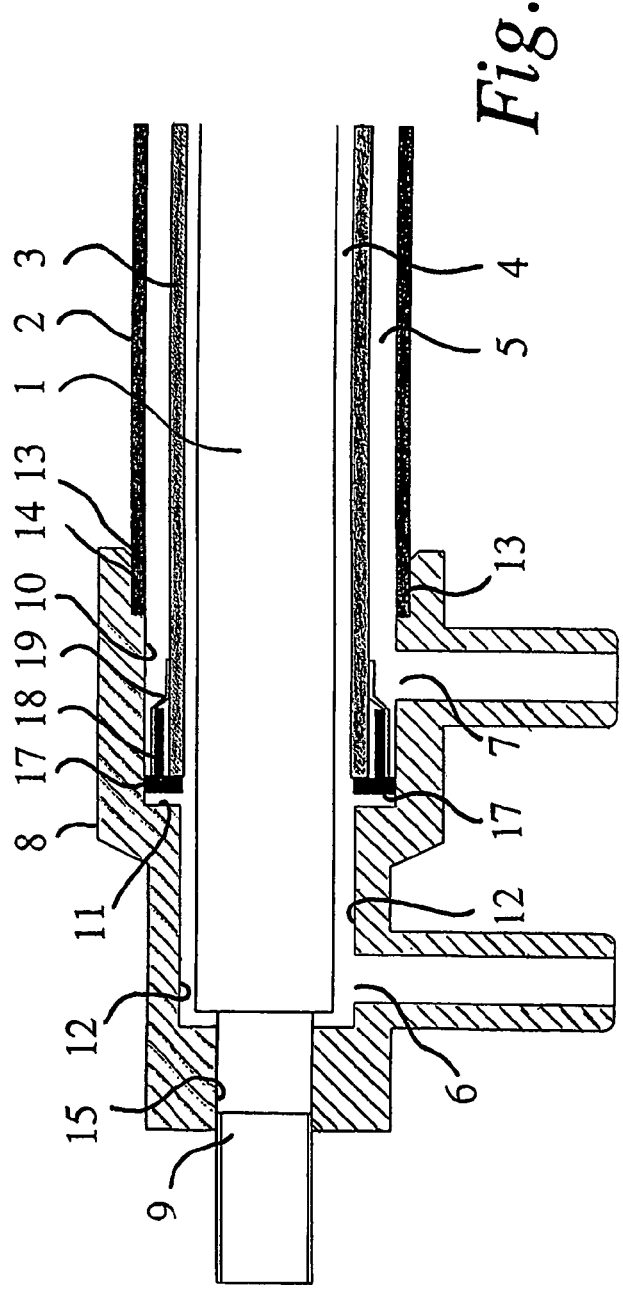

ELECTROCHEMICAL CELLS

BACKGROUND

This invention relates to electrochemical cells.

FIELD

The invention is particularly, though not exclusively, concerned with electrochemical cells of the kind used for purification of water and the production of disinfecting aqueous solutions. Electrochemical cells of this kind have been proposed in which an ion-permeable, ceramic membrane is interposed between coaxial electrodes, and it is one of the object of the present invention to provide an improved form of such a cell.

SUMMARY

According to the present invention there is provided an electrochemical cell in which an inner cylindrical electrode extends coaxially within a tube of ion-permeable material that is mounted coaxially within a hollow, cylindrical outer electrode to define inner and outer annular passageways between the respective electrodes and said tube for liquid-flow-lengthwise of them from one to the other of cup-shape fittings at either end of the cell, each cup-shape fitting having two inlet/outlet ports that communicate with the inner and outer passageways respectively, wherein each cup-shape fitting defines a cylindrical cavity which has an open-mouth that is of a diameter to receive a respective end of the outer electrode for liquid-tight sealing therewith, said tube projects at each end of the cell from within the outer electrode into said cavity of the fitting at that end and has an annular rim for engagement with an internal cylindrical wall of the cavity for liquid-tight sealing therewith to separate the inner and outer passageways from one another within the fitting, and the inner electrode projects at each end of the cell from said tube into the cavity of the fitting at that end.

The outer electrode may be a metal tube, and the inner electrode a metal rod. The metal involved in each case may be titanium, however, where the electrode is for use as the cathode of the cell it may, as an alternative, be of stainless steel. Where the electrode is for use as the anode, it may have a coating (for example, of ruthenium and iridium oxides) that acts as a catalyst in the electrochemical operation of the cell.

The ion-permeable tube may be porous and in this respect may be of a ceramic material, for example composed of aluminium, zirconium and yttrium oxides. The annular rim at each end of the cell may be slidable within the cavity of the fitting at that end to enable sliding of the ion-permeable tube relative to the inner and outer electrodes, and may be provided by a flange of a member that is sealed or otherwise secured to the ion-permeable tube at that end. The extent to which the ion-permeable tube can slide relative to the inner and outer electrodes may be limited by abutment within the cavity at each end of the cell. The abutment may be with a part (for example, a pin or annular rim) that projects laterally into the cavity, or of a longitudinal projection from the tube-end with the bottom of the cavity, or of a longitudinal projection from the bottom of the cavity with the tube-end.

The cavity of each cup-shape fitting may have a stepped internal diameter for defining a first cavity-part leading from the open mouth and a second cavity-part of smaller diameter opening from the first cavity-part. In these circumstances, the ion-permeable tube may project at each end of the cell from within the outer electrode into the first cavity-part of the fitting at that end to have its annular rim engage with the internal cylindrical wall of the first cavity-part. The inlet/outlet ports of each fitting may open into/from the first and second cavity-parts respectively.

An electrochemical cell in accordance with the present invention will now be described, by way of example, with reference to the accompanying drawing, in which:

BRIEF DESCRIPTION OF THE DRAWINGS

FIG. 1 is a part sectional side-elevation of the electrochemical cell according to the invention; and FIG. 2 is an enlarged sectional side-elevation of one end of the electrochemical cell of FIG. 1.

DETAILED DESCRIPTION

Referring to FIGS. 1 and 2, the inner and outer electrodes of the electrochemical cell are formed by a coaxial rod 1 and tube 2 respectively. The rod 1 and tube 2 are of titanium and the inside surface of the tube 2, which is to act as the anode, is coated with ruthenium and iridium oxides that act as a catalyst in the electrochemical operation of the cell. A porous ceramic tube 3 composed of aluminium, zirconium and yttrium oxides, is supported coaxially between the rod 1 and tube 2 to provide an intermediate ion-permeable membrane for separating the products derived electrochemically at the two electrodes. More particularly, the tube 3 divides the space between the rod 1 and tube 2 into two coaxial, annular passageways 4 and 5 for liquid-flow lengthwise of the electrodes formed by the rod 1 and tube 2.

The passageways 4 and 5 terminate at either end of the cell in sideways-extended inlet/outlet ports 6 and 7, respectively, of individual one-piece plastics fittings 8 (for example, of polypropylene) that are retained on opposite ends 9 of the rod 1. Each fitting 8 is of cup-shape with a stepped internal diameter that defines a first cylindrical cavity-part 10 into/from which the port 7 opens, and which leads via an annular end-face 11 (FIG. 2) into a second cylindrical cavity-part 12 of smaller diameter into/from which the port 6 opens. The ends 13 of the tube 2 are lightly machined externally over a short length (for example, 5 mm) so as to enable them to be received and provide liquid-tight sealing, in recessed mouths 14 (FIG. 2) of the cavity-parts 10 of the fittings 8.

The rod 1, on the other hand, extends axially through both cavity-parts 10 and 12 of each fitting 8, and has ends 9 of reduced diameter. The end 9 within each fitting 8 projects from the cavity-part 12 into and through a bore 15 of the fitting 8. It is a liquid-tight interference fit within the bore 15 (it may be lightly machined over a length of, for example, 5 mm, to ensure a constant diameter for the purpose), and is screw-threaded to receive a nut 16 (only one shown, in FIG. 1) where it projects from the fitting 8. The nuts 16 are tightened to clamp the fittings 8 firmly onto the two ends 13 of the tube 2 and hold them to the rod 1 with the rod 1 and tube 2 coaxial with one another.

The tube 3, which projects beyond the ends 13 of the tube 2 within the cavity-part 10, has a radial rim or flange 17 (FIG. 2) at each end. Each flange 17 is part of a plastics tubular moulding 18 which is retained on the tube 3 by a plastics sleeve 19 that is heat-shrunk onto the respective end of the tube 3; the dimensioning of the moulding 18 allows for manufacturing tolerances in tube-diameter. The flange 17 provides a liquid-tight, sliding fit within the internal cylindrical wall of the respective cavity-part 10, separating the passageways 4 and 5 from one another within the fitting 8 at that end.

More especially, the extent of projection of the tube 3 beyond the end 13 of the tube 2 within each fitting 8 ensures that the flange 17 is located deeper within the cavity-part 10 than the port 7 so that it maintains appropriate separation of the port 7 from the cavity-part 12 and port 6. The integrity of this separation is maintained since the freedom of the tube 3 to slide relative to the tube 2 is limited to a small distance (for example, 1 to 2 mm) by the walls 11 at both ends of the cell. However, the freedom for sliding ensures that the clamping forces exerted by the nuts 16 clamping the fittings 8 to the ends 13 of the tube 2 and holding them on the ends 9 of the rod 1, are not exerted on the tube 3. The fact that the somewhat-fragile, ceramic tube 3 is not subject to any clamping force avoids the need to cushion it resiliently.

The attachment of the mouldings 18 to the tube 3 may be by adhesive instead of the heat-shrunk sleeves 19, or by bonding them on by heating the ends of the tube 3 so that the plastics is partially melted as the mouldings 18 are pushed on.

The form of construction of the electrochemical cell described above, has significant advantages of simplicity and economy in that the number of components is reduced as compared with earlier forms, and the extent of machining required is light and limited to the ends 9 of the rod 1 and the ends 13 of the tube 2. Moreover, stock material may be used for the electrodes (for example seam-welded tubing may be used for the tube 2), and the porous ceramic tube 3, which for example, may have a porosity between 50% and 70% with a pore size of between 0.3 and 0.5 microns, is not required to withstand compressional forces or satisfy tight dimensional tolerance-limits. The flanges 17 of the mouldings 18 attached to the ends of the tube 3 provide both the sliding freedom and the liquid-tight sealing required, in a simple manner without any strict dimensional requirement on tube-diameter.

The invention claimed is:

1. An electrochemical cell comprising:
    an inner cylindrical electrode extends coaxially within a tube of ion-permeable material that is mounted coaxially within a hollow, cylindrical outer electrode to define inner and outer annular passageways between the respective electrodes and said tube for liquid-flow lengthwise of them from one to the other of cup-shape fittings at either end of the cell, each cup-shape fitting having two inlet/outlet ports that communicate with the inner and outer passageways respectively, wherein each cup-shape fitting defines a cylindrical cavity which has an open-mouth that is of a diameter to receive a respective end of the outer electrode for liquid-tight sealing therewith, said tube projects at each end of the cell from within the outer electrode into said cavity of the fitting at that end and has an annular rim which is attached to the tube in abutment with the annular end of the tube and which engages an internal cylindrical wall of the cavity for liquid-tight sealing therewith to separate the inner and outer passageways from one another within the fitting, and the inner electrode projects at each end of the cell from said tube into the cavity of the fitting at that end.

2. An electrochemical cell according to claim 1 wherein the outer electrode is a metal tube.

3. An electrochemical cell according to claim 1 wherein the inner electrode is a metal rod.

4. An electrochemical cell according to claim 1 wherein the particular one of the electrodes that is to act as the cathode of the cell, is of titanium or stainless steel.

5. An electrochemical cell according to claim 1 wherein the particular one of the electrodes that is to act as the anode of the cell is of titanium.

6. An electrochemical cell according to claim 5 wherein the anode electrode has a coating that acts as a catalyst in the electrochemical operation of the cell.

7. An electrochemical cell according to claim 6 wherein the coating of the anode electrode is of ruthenium and iridium oxides.

8. An electrochemical cell according to claim 1 wherein the ion-permeable tube is of a porous ceramic material.

9. An electrochemical cell according to claim 8 wherein the ceramic material is composed of aluminium, zirconium and yttrium oxides.

10. An electrochemical cell according to claim 1 wherein the annular rim at each end of the cell is slidable within the cavity of the fitting at that end to enable sliding of the ion-permeable tube relative to the inner and outer electrodes.

11. An electrochemical cell according to claim 10 wherein the annular rim at each end of the cell comprises a flange of a member that is sealed or otherwise secured to the ion-permeable tube at that end.

12. An electrochemical cell according to claim 10 wherein the extent to which the ion-permeable tube can slide relative to the inner and outer electrodes is limited by an abutment within the cavity at each end of the cell.

13. An electrochemical cell according to claim 1 wherein the cavity of each cup-shape fitting has a stepped internal diameter for defining a first cavity-part leading from the open mouth and a second cavity-part of smaller diameter opening from the first cavity-part.

14. An electrochemical cell according to claim 13 wherein the ion-permeable tube projects at each end of the cell from within the outer electrode into the first cavity-part of the fitting at that end to have its annular rim engage with the internal cylindrical wall of the first cavity-part, and the inlet/outlet ports of each fitting open into/from the first and second cavity-parts respectively.

* * * * *